(12) United States Patent
Slovak et al.

(10) Patent No.: US 11,161,046 B2
(45) Date of Patent: Nov. 2, 2021

(54) ARTIFICIAL INTELLIGENCE BASED VIDEO GAME STATE DETECTION

(71) Applicants: Christopher Bogart Slovak, Carlsbad, CA (US); Christopher Scott Andres, La Jolla, CA (US); Thomas Patrick McClory, Carlsbad, CA (US)

(72) Inventors: Christopher Bogart Slovak, Carlsbad, CA (US); Christopher Scott Andres, La Jolla, CA (US); Thomas Patrick McClory, Carlsbad, CA (US)

( * ) Notice: Subject to any disclaimer, the term of this patent is extended or adjusted under 35 U.S.C. 154(b) by 61 days.

(21) Appl. No.: 16/870,755

(22) Filed: May 8, 2020

(65) Prior Publication Data
US 2020/0353363 A1 Nov. 12, 2020

Related U.S. Application Data

(60) Provisional application No. 62/846,347, filed on May 10, 2019.

(51) Int. Cl.
| | |
|---|---|
| *A63F 13/35* | (2014.01) |
| *A63F 13/67* | (2014.01) |
| *A63F 13/69* | (2014.01) |
| *A63F 13/355* | (2014.01) |

(52) U.S. Cl.
CPC .............. *A63F 13/69* (2014.09); *A63F 13/35* (2014.09); *A63F 13/355* (2014.09); *A63F 13/67* (2014.09)

(58) Field of Classification Search
None
See application file for complete search history.

(56) References Cited

U.S. PATENT DOCUMENTS

| | | | |
|---|---|---|---|
| 2004/0193441 A1* | 9/2004 | Altieri | A63F 13/65 709/203 |
| 2009/0203449 A1* | 8/2009 | Douceur | A63F 13/12 463/42 |
| 2020/0171382 A1* | 6/2020 | Agoston | G06F 9/5083 |

* cited by examiner

*Primary Examiner* — Damon J Pierce
(74) *Attorney, Agent, or Firm* — Plager Schack LLP; Mark H. Plager; Stephen Hallberg

(57) ABSTRACT

An artificial intelligence based video game state and game behavior detection system and artificial intelligence based processes for detecting video game state and game behavior are disclosed. The artificial intelligence based video game state and game behavior detection system and the artificial intelligence based processes eliminate the restrictions and requirements of using third party provided means by collecting and process data directly from the game device, and then translating the game state into game data using a combination of machine learning and deep learning algorithms.

10 Claims, 5 Drawing Sheets

ARTIFICIAL INTELLIGENCE BASED VIDEO GAME STATE DETECTION

CLAIM OF BENEFIT TO PRIOR APPLICATION

This application claims benefit to U.S. Provisional Patent Application 62/846,347, entitled "Artificial Intelligence Based Video Game State Detection," filed May 10, 2019. The U.S. Provisional Patent Application 62/846,347 is incorporated herein by reference.

BACKGROUND

Embodiments of the invention described in this specification relate generally to state systems, and more particularly, to an artificial intelligence based video game state and game behavior detection system and artificial intelligence based processes for detecting video game state and game behavior.

Access to real-time data in video games is limited through current means, yet new business models, data analytics and advancements in devices (virtual reality/mobile) require new means of data collection.

Several appliances exist that enable gaming and many games as well as the appliance do not provide real time collection of game state and user game behavior. For third party solutions interested in accessing this game data the only current solution to access require the use of game developer, game platform or device provided application programming interfaces (APIs) and software development kits (SDKs).

Therefore, what is needed is a way to perform real time collection of game state and user game behavior without a game developer, game platform or device-provided APIs or SDKs.

BRIEF DESCRIPTION

A novel artificial intelligence based video game state and game behavior detection system and artificial intelligence based processes for detecting video game state and game behavior are disclosed. In some embodiments, the artificial intelligence based video game state and game behavior detection system and artificial intelligence based processes for detecting video game state and game behavior capture real time streams of image and video data collected from an installed utility on a game platform that is targeted for evaluation and processing of a game that is being simultaneously played on the game platform.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
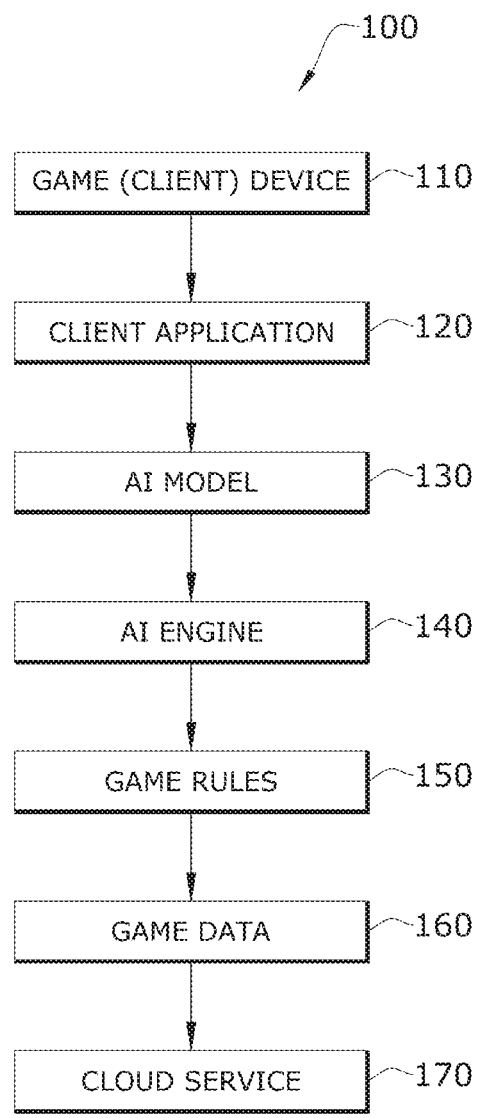
FIG. 1 conceptually illustrates a component view of an artificial intelligence based video game state and game behavior detection system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel artificial intelligence based video game state and game behavior detection system and artificial intelligence based processes for detecting video game state and game behavior. In some embodiments, the artificial intelligence based video game state and game behavior detection system and artificial intelligence based processes for detecting video game state and game behavior capture real time streams of image and video data collected from an installed utility on a game platform that is targeted for evaluation and processing of a game that is being simultaneously played on the game platform.

As stated above, access to real-time data in video games is limited through current means, yet new business models, data analytics and advancements in devices (virtual reality/mobile) require new means of data collection. For instance, existing appliances that enable gaming do not provide real time collection of game state and user game behavior. For third party solutions interested in accessing this game data the only current solution to access require the use of game developer, game platform or device provided application programming interfaces (APIs) and software development kits (SDKs). Embodiments of the artificial intelligence based video game state and game behavior detection system and artificial intelligence based processes for detecting video game state and game behavior described in this specification solve such problems by evaluating, processing, and determining the current state of a video game, through a real time stream of image and video data collected from an installed utility on the platform in which the game is played. In this way, the artificial intelligence based video game state and game behavior detection system and artificial intelligence based processes for detecting video game state and game behavior eliminate the restrictions and requirements of using third party provided means by collecting and evaluating/processing data directly from the game device, and then translating the game state into game data using a combination of machine learning and deep learning algorithms.

Embodiments of the artificial intelligence based video game state and game behavior detection system and artificial intelligence based processes for detecting video game state and game behavior described in this specification differ from and improve upon currently existing options. In particular, some embodiments differ because current solutions require the use of APIs or SDKs provided by a particular game or device, either or both of which supply the game data in question. However, the existing conventional approach of using APIs and SDKs from the games/gaming devices/platforms are limited in scope since they are developed on behalf of a third party that may or may not include all the relevant data points that other systems need for analytics and game data processing.

In addition, some embodiments of the artificial intelligence based video game state and game behavior detection system and artificial intelligence based processes for detecting video game state and game behavior improve upon the currently existing options because they are typically not real-time sources, and generally fail to provide the granularity of data needed by third parties. Additionally, using currently available sources restricts the third parties to API call limits and licensing. In contrast, the artificial intelligence based video game state and game behavior detection system and artificial intelligence based processes for detecting video game state and game behavior of the present disclosure eliminates the restrictions and requirements of using third party provided means by collecting and process data directly from the game device, and then translating the game state into game data using a combination of machine learning and deep learning algorithms.

The artificial intelligence based video game state and game behavior detection system and artificial intelligence based processes for detecting video game state and game behavior of the present disclosure may be comprised of the following elements. This list of possible constituent elements is intended to be exemplary only and it is not intended that this list be used to limit the artificial intelligence based video game state and game behavior detection system and artificial intelligence based processes for detecting video game state and game behavior of the present application to just these elements. Persons having ordinary skill in the art relevant to the present disclosure may understand there to be equivalent elements that may be substituted within the present disclosure without changing the essential function or operation of the artificial intelligence based video game state and game behavior detection system and artificial intelligence based processes for detecting video game state and game behavior.

1. Game Device
2. Client Application
3. Game Rules
4. Game Data
5. Game Stream Processor
6. Game State Detection The various elements of the artificial intelligence based video game state and game behavior detection system and artificial intelligence based processes for detecting video game state and game behavior of the present disclosure may be related in the following exemplary fashion. It is not intended to limit the scope or nature of the relationships between the various elements and the following examples are presented as illustrative examples only. The Client Application (2) is installed on the Game Device (1) when downloaded by a user from the internet. The Client Applications uses Game Rules (3) to determine when and what Game Data (4) to transmit to the Game Stream Processor (5) which processes and runs logic against the Game Data (4) which is used to store the state in the Game State Detection (6) system.

By way of example, FIG. 1 conceptually illustrates a component view of an artificial intelligence based video game state and game behavior detection system 100. The component view of an artificial intelligence based video game state and game behavior detection system 100 shown in FIG. 1 is various described by reference to FIG. 3, which conceptually illustrates a flow chart of operations performed by an artificial intelligence based video game state and game behavior detection system 300. As shown in this figure, the component view of the artificial intelligence based video game state and game behavior detection system 100 includes a game (client) device 110, a client application 120, an artificial intelligence (AI) model 130, an AI engine 140, game rules 150, game data 160, and a network-based cloud-computing service 170.

The artificial intelligence based video game state and game behavior detection system 100 works by the client application 120 being installed on the game (client) device 110, which is also referred to as the game appliance or the appliance, and is the hardware-based electrical/computing device on which the game executable runs, or virtual software that runs the game. Examples of appliances or game (client) devices 110 include, without limitation, personal computers (PCs), mobile devices (including smartphones and tablet computing devices), over-the-internet boxes, remote game servers, gaming consoles, virtual reality systems, other virtual software or virtual machines, or other platforms in which games can be executed. The client application 120 implements the client device-side artificial intelligence based processes for detecting video game state and game behavior of the present disclosure, and therefore, includes the logic to locally detect and process video game data 160. The detection and processing of the video game data 160 is performed by the client application 120 locally, meaning that the detection and processing started and completed on the actual game (client) device 110. Thus, depending on the availability and capability of the supported game, the client application 120 may launch the game executable on the game (client) device 110 as well as enter the game player into a specific game match, map, game type, or other configuration. After the game executable has been started on the game (client) device 110, the client application 120 begins the collection and distribution of game data 160, as well as other logical and/or programmatic operations to locally detect and process the data of the executing game.

The AI model 130 is downloaded from the network-based cloud-computing service 170 and includes the configuration for the client application 120 to operate. The network-based cloud-computing service 170 includes various cloud services that collect and process game data 160 to perform business transactions and develop new AI models 130 and game rules 150. The network-based cloud-computing service 170 and its operations for performing business transactions and developing new AI models and game rules based on the collected and processed game data are described in greater detail below, by reference to FIG. 4. The AI engine 140 is a based on the AI model 130 and runs as a sub-process of the client application 120. Specifically, when the client application 120 is running, the AI engine 140 uses the AI model 130 to determine/identify the game that is running. The AI engine 140 uses the game rules 150 to learn more about the game data 160 that may be involved in the game and when such game data 160 may be available to collect. Game data 160 includes the relevant game state information and the format of the game data 160 to be transmitted. As such, by using the game's own configuration rules (game rules 150), the AI engine 140 can determine the format of the game data 160 it will be collecting and distributing as well as when such video game data 160 shall be collected and distributed.

Figure 3:
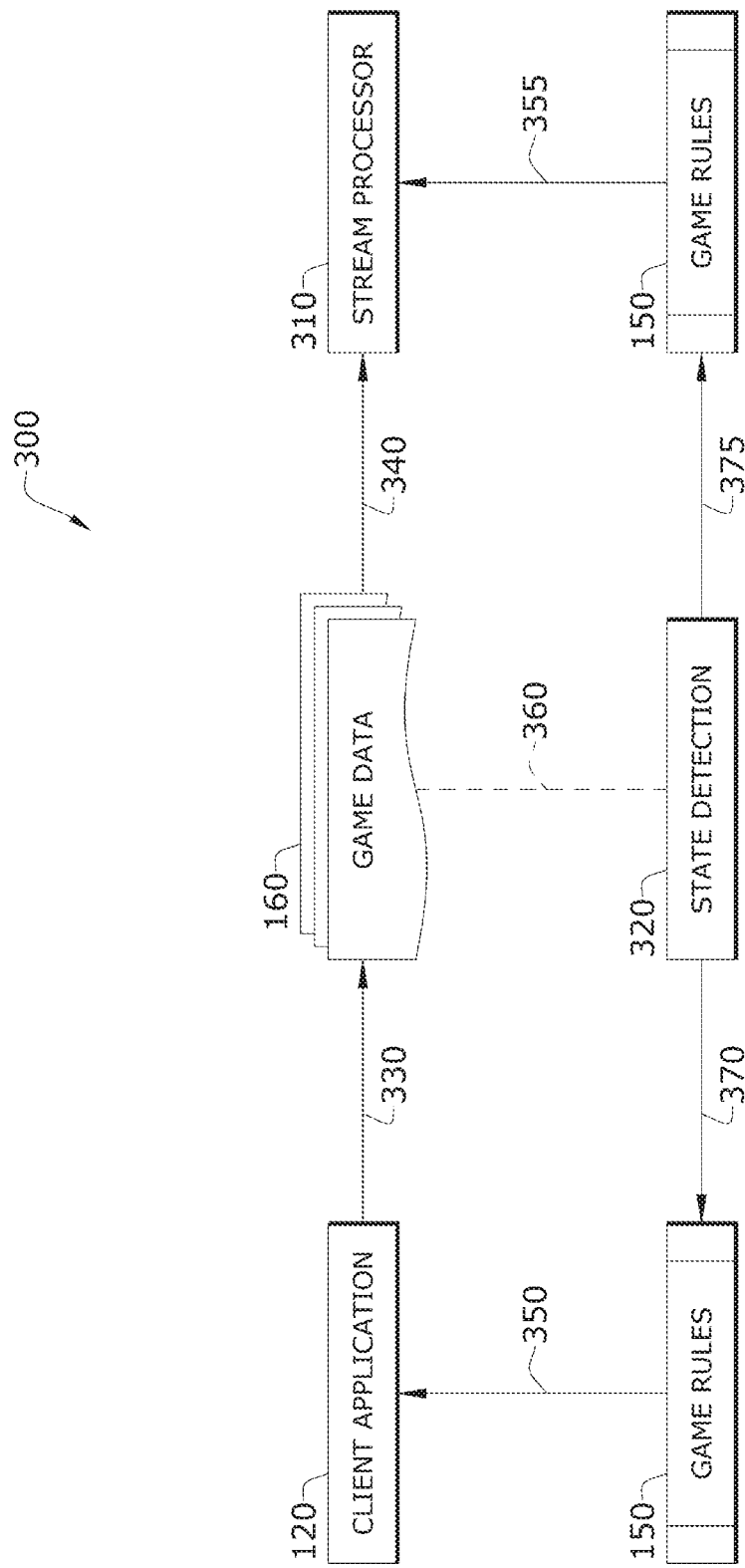
FIG. 3 conceptually illustrates a flow chart of operations performed by an artificial intelligence based video game state and game behavior detection system in some embodiments.

Referring now to FIG. 3, the flow chart of operations performed by an artificial intelligence based video game state and game behavior detection system 300 shows that the client application 120 begins the collection and distribution (at 330) of the game data 160 after starting on the game (client) device 110. The flow chart of operations performed by an artificial intelligence based video game state and game behavior detection system 300 shows that the game data 160, or "streamed game data 160", is multi-faceted, and therefore, may take the form of images, video, HTTP requests, HTTPS secure requests, API requests, and/or files and text transfers in the form of JSON, XML, CSV or other readily consumable format.

Turning back to the component view of an artificial intelligence based video game state and game behavior detection system 100 shown in FIG. 1, the game rules 150 may be read (or ingested/imported) by the client application 120 from configuration files, code libraries, or API connectivity, or other such forms. The client application 120 then uses the game rules 150 to collect and process the game data 160 by way of the AI engine 140, which is running as a sub-process of the client application 120 and which itself is based on the AI model 130 received from the network-based cloud-computing service 170.

Now referring back to FIG. 3, the flow chart of operations performed by an artificial intelligence based video game state and game behavior detection system 300 shows that the client application 120 includes (at 350) the game rules 150 as a configuration of (at 370) a state detection game state engine 320, no matter whether the game rules 150 take the form of configuration files, code libraries, API connectivity and data responses, or other game rules formats.

Turning back to the component view of an artificial intelligence based video game state and game behavior detection system 100 shown in FIG. 1, the AI engine 140, which is based on the AI model 130, provides state detection operations through the state detection game state engine 320. The AI engine 140 also processes the game data 160 collected by the client application 120, before provided a package of processed game data to the network-based cloud-computing service 170 for business transaction processing and AI model updating.

While the basics components of the artificial intelligence based video game state and game behavior detection system are summarized in the description of the component view of an artificial intelligence based video game state and game behavior detection system 100 of FIG. 1, the functional and data communication/transmission aspects of the artificial intelligence based video game state and game behavior detection system continue in greater depth in the description of FIG. 3.

Specifically, FIG. 3 demonstrates the federated logic of the artificial intelligence based video game state and game behavior detection system by way of the flow chart of operations which takes advantage of distributed computing concepts, thereby enabling the client application 120 to perform all game state detection processing locally, as part of the state detection game state engine 320, or none of the game state detection within the client application 120 itself. Based on the game rules 150, the game being played, and the client application 120, the game data 160 will be streamed (at 340) to a stream processor 310 server, which itself references the game rules 150 (via 355) and indirectly the state detection game state engine 320 (via 375) in some embodiments.

The game data 160 is collected and streamed, by the stream processor 310, to the client application 120 for local AI engine 140 processing. The game data 160 that is streamed may include and represent the current user game behavior, such as but not limited to game type, game stage, appliance demographics, application telemetry, network connectivity or other related game state data (via 360). The streamed game data 160 may be in raw form (or format) such as, without limitation, video format, still image format, game feed formats, or may be transmitted in an interpreted state, such as a "match start" state, a "game pause" state, a "user win" state, a "user loss" state, etc. In the case of a user win state or a user loss state, this shall be as related to the game being played. For example, in a First Person Shooter (FPS) or Third Person Shooter (TTP), a user win state may be considered the killing of another user in game, where a user loss state may be considered the death of the user as a result of, or by, another game player. This association will be determined by the game genre and may or may not be included in the game rules 150.

Once the streamed game data 160 has been transmitted (via 340) to the state detection game state engine 320 by the stream processor 310, the game data 160 is reviewed in accordance with the game rules 150 (transmitted via 355) and processes in that service (locally, as the client application 120 or sub-process of the client application 120). Additionally, the state detection game state engine 320 determines, manages, distributes, and configures the client application 120, the stream processor 310 and rules 150 (via 350 and 355, respectively) and specifies the streamed game data 160 (via 360). The state detection game state engine 320 uses a combination of deterministic and algorithmic processes to determine the current state of a game-playing user based on the streamed game data 160. In the case of the streamed game data 160 being a video stream, the algorithms used by the state detection game state engine 320 may match the game interface or be algorithms of previously learned interfaces, such algorithms employed to determine, for example, what game is being played, the state of the user in the game, and the context values shared within the game user interface. Those context values are often located in what is referred to as a Heads Up Display (HUD). This mix of algorithmic and cognitive learning, optical character recognition and client application data provides a real time feed of the user's game behaviors, choices, and game state, as well as other game users with whom a subject user is interacting when relevant.

As a collective solution, the artificial intelligence based video game state and game behavior detection system and artificial intelligence based processes for detecting video game state and game behavior of the present disclosure provides a video game detection platform that can detect a game state on any game playing appliance, for example, the game (client) device 110, in real time, enabling the immediate determination of the game user's interactions with the game and other players in the game. The game state, as detected by the state detection game state engine 320, is a combination of game data 160 and sequence (of interactions, events, etc.). For example, the game state at the start of a game may be "pending" until such time as when the game data 160 stipulates or indicates that the game match has begun. This game state is imperative as it defines the next phase of game play and informs the AI models 130 for the AI engine 140 which game data 160 to evaluate. For example, at the "game start" when the user may configure the game and the match, and upon acceptance, the game will launch into a "match pending" state until the match actually starts. Once the match has started the users may be in a cycle of match play and changing user states (wins, losses, kills, deaths) until the end of the match. This state may additionally launch the user into another cycle of match or prompt the user to end the game.

Figure 2:
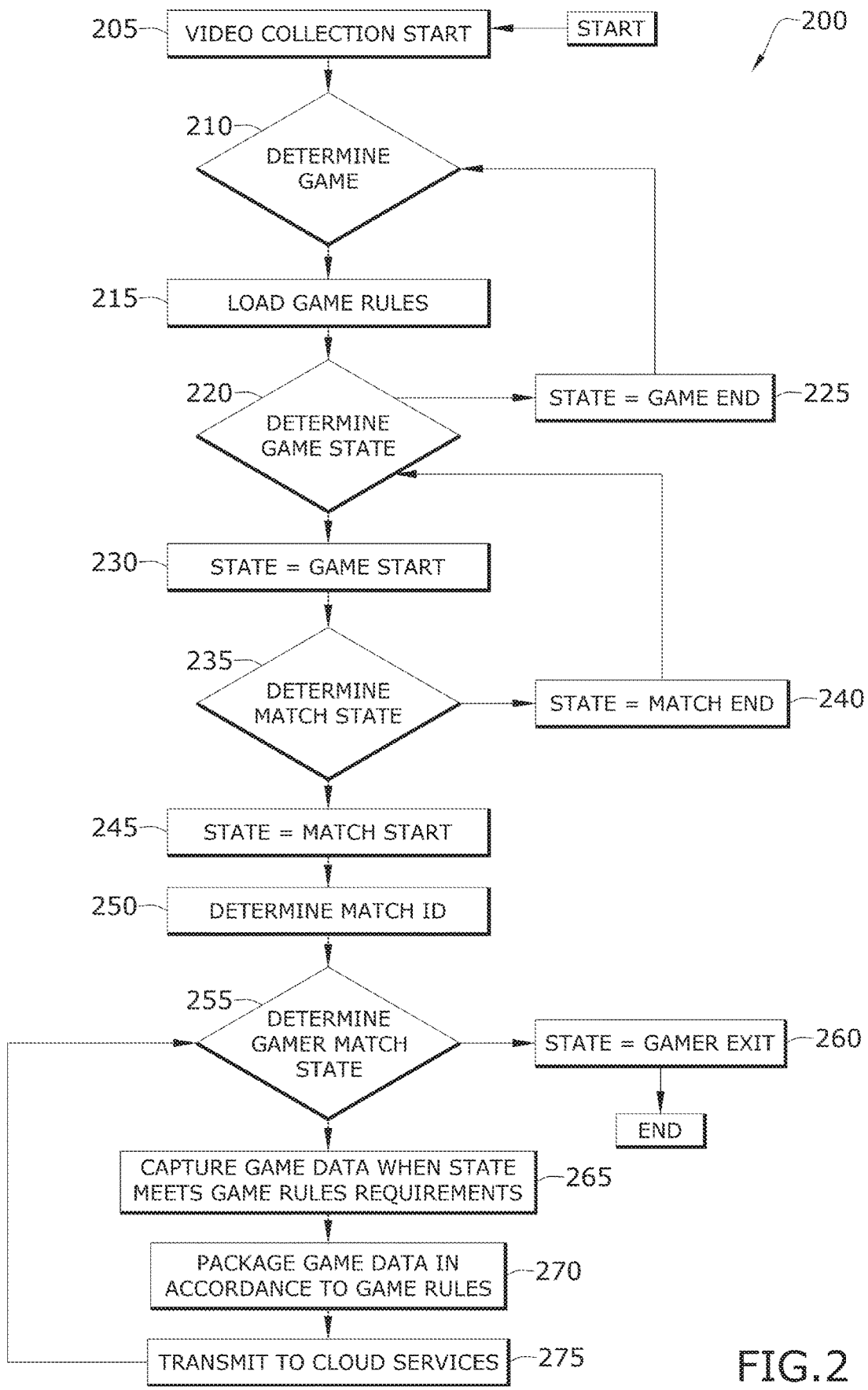
FIG. 2 conceptually illustrates an artificial intelligence based game rule logic process for detecting video game state and game behavior in some embodiments.

By way of example, FIG. 2 conceptually illustrates an artificial intelligence based game rule logic process for detecting video game state 200. As shown in this figure, the artificial intelligence based game rule logic process for detecting video game state 200 initially begins by starting video collection (at 205). At this stage, the artificial intelligence based game rule logic process for detecting video game state 200 starts video collection and the AI engine 140 begins to analyze the streamed video data, eventually translating the video data into data that can be reviewed to determine state. The artificial intelligence based game rule logic process for detecting video game state 200 of some embodiments then determines (at 210) the game. In determining the game (at 210), the artificial intelligence based game rule logic process for detecting video game state 200 may determine the game type, the game author, the game publisher, the game edition, or any other aspects needed to determine which game is being launched on the client (game) device 110. After determining the game (at 210), the artificial intelligence based game rule logic process for detecting video game state 200 loads the game rules (at 215). Specifically, the game rules 150 are pre-loaded into memory, such as random access memory (RAM) or other transitory memory on the game (client) device 110 in the memory space of the client application 120.

In some embodiments, after the game rules are loaded into memory, the artificial intelligence based game rule logic process for detecting video game state 200 determines (at 220) the present game state. The present game state is determined by any relevant manner, such as a menu screen, a title screen, or other screens. For example, if the game is closed, the application goes idle and waits for another game to be loading, which indicates that the present game state is "game end". Accordingly, when the game state is determined to be "game end" or end of the game (at 225), the artificial intelligence based game rule logic process for detecting video game state 200 reverts back to the determination of the game (at 210). For example, the player has ended a game match, and may load a different game or type of game, or just waiting in an idle state. On the other hand, when the game state is determined to be a game state other than "game end" state, then the artificial intelligence based game rule logic process for detecting video game state 200 proceeds to set the game state to "game start" (at 230). In some embodiments, when the game state is determined to be "game start", the artificial intelligence based game rule logic process for detecting video game state 200 begins to evaluate the match state for the game. In this case, there is only "game start" state or "game end" state that can occur. Additional game states, such as match states, are possible after starting the game.

In some embodiments, the artificial intelligence based game rule logic process for detecting video game state 200 determines (at 235) the match state after the game has started. When the match state is "match end" (at 240), then the artificial intelligence based game rule logic process for detecting video game state 200 reverts back to the determination (at 220) of the game state. On the other hand, when the game match state is not "match end", then the artificial intelligence based game rule logic process for detecting video game state 200 sets the game match state to "match start". Next, the artificial intelligence based game rule logic process for detecting video game state 200 determines or identifies a game match identifier (at 250) or "match ID". In some embodiments, the artificial intelligence based game rule logic process for detecting video game state 200 collects and stores the match ID for the identified match. Then the artificial intelligence based game rule logic process for detecting video game state 200 evaluates the match state, such as waiting, loading, lobby, etc.

When the match state starts, the artificial intelligence based game rule logic process for detecting video game state 200 of some embodiments evaluates the gamer match state. The gamer match state is the specific state of a game-playing user (or simply "user" or "player") in the specific game being played. After evaluating the gamer match state, the artificial intelligence based game rule logic process for detecting video game state 200 of some embodiments evaluates the gamer match state against the game rules to determine (at 255) whether a state change occurred which warrants the collection of data. When the user/gamer exits, the artificial intelligence based game rule logic process for detecting video game state 200 sets the state to "gamer exit" (at 260). For example, the client (game) device 110 is powered off, or exits a gaming engine. Then the artificial intelligence based game rule logic process for detecting video game state 200 ends.

On the other hand, when the user/gamer does not exit, then the artificial intelligence based game rule logic process for detecting video game state 200 may determine whether the gamer match state warrants collection and packaging of game data into the format as specified in the game rules, such as video format, image format, text format, API call format, etc. In such case as the gamer match state affirmatively warrants collection of the game data, such as when the gamer match state meets the game rules requirement, the artificial intelligence based game rule logic process for detecting video game state 200 captures game data (at 265). Next, the artificial intelligence based game rule logic process for detecting video game state 200 packages the game data (at 270) in accordance with game rules and transmits the packaged game data (at 275) to the network-based cloud-computing services. In some embodiments, the artificial intelligence based game rule logic process for detecting video game state 200 reverts back to the determination (at 255) of the gamer match state, and continues to cycle through the steps 265-275 until the gamer match state is determined (at 255) to be the "gamer exit" state (at 260). Then the artificial intelligence based game rule logic process for detecting video game state 200 ends.

To make the artificial intelligence based video game state and game behavior detection system and artificial intelligence based processes for detecting video game state and game behavior of the present disclosure, one may craft software that is able to complete the requisite tasks as described above, by reference to FIGS. 1-3, and below, by reference to FIG. 4. Additionally, the end game user would install the client application 120 on to the client (game) device 110, which could be done by downloading from the cloud (internet) or by installation from a disc, such as a compact disc (CD), digital versatile disc (DVD), or Blu-Ray disc (BD), flash drive, etc.

To use the artificial intelligence based video game state and game behavior detection system and artificial intelligence based processes for detecting video game state and game behavior of the present disclosure, a user/gamer just plays a video game after installation is completed on the client (game) device 110 and the client application 120 will be used to track the game state of the user/gamer in real-time through the processing of game data. The game data can be video captures of screen/game realtime video, imagery, etc. The storage of this data along with the state of the game will be compared against other game and state datasets of other users/gamers to determine when two or more individuals have participated together in game events or matches. Once identified, further systems can aggregate and process these dataset(s) for detailed game analytics, fraud detection, and peer-to-peer contest tracking, among other things. In this way, the artificial intelligence based video game state and game behavior detection system and artificial intelligence based processes for detecting video game state and game behavior of the present specification enable game data analysis without reliance on third party SDKs or APIs and, therefore, avoids (bypasses) the limitations those third party SDKs and APIs introduce or require.

Figure 4:
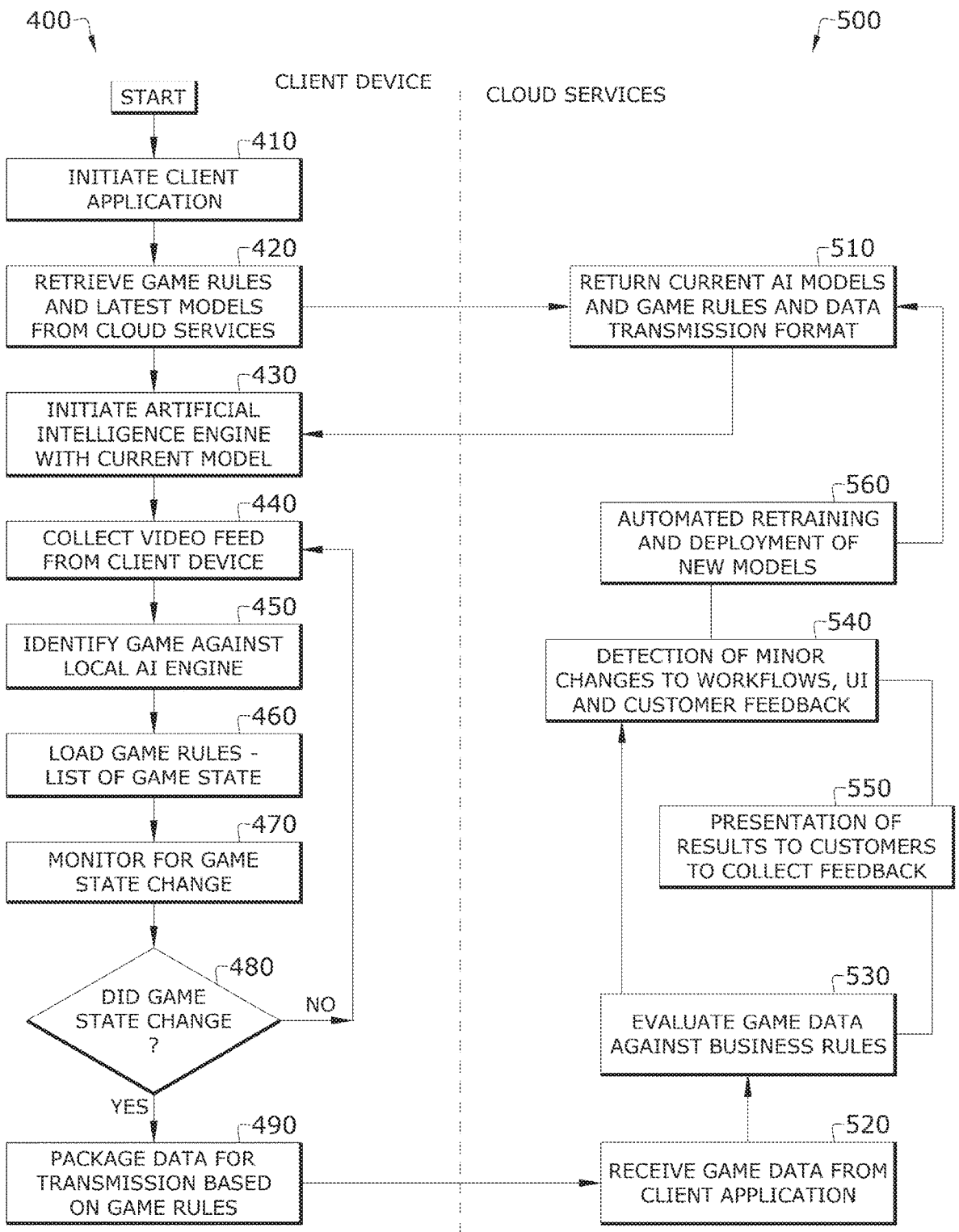
FIG. 4 conceptually illustrates client-side and server-side artificial intelligence based runtime processes for detecting video game state and game behavior in some embodiments.

By way of example, FIG. 4 conceptually illustrates client-side and server-side artificial intelligence based runtime processes for detecting video game state and game behavior. Specifically, a client-side artificial intelligence based runtime process 400 for detecting video game state and game behavior is shown on a client device side of this figure, and a server-side artificial intelligence based runtime process 500 for detecting video game state and game behavior is shown on a cloud services side of this figure (bifurcated by a dashed dividing line that conceptually suggests a communicable connected between them, no matter how distant a physical separation exists between them). Also, some steps of the client-side artificial intelligence based runtime process 400 involve interaction with the server-side artificial intelligence based runtime process 500. Similarly, some steps of the server-side artificial intelligence based runtime process 500 involve interaction with the client-side artificial intelligence based runtime process 400.

In some embodiments, the client-side artificial intelligence based runtime process 400 starts by initiating the client application (at 410). For example, the client application 120 is run on from the game (client) device 110. Next, the client-side artificial intelligence based runtime process 400 retrieves game rules and the latest AI model(s) from the cloud services (at 420). In some embodiments, the client-side artificial intelligence based runtime process 400 first checks with the cloud services for any updates to the game rules and local AI model that the client application 120 will run, and when an update is available, will download the update. Accordingly, on the cloud services side, the server-side artificial intelligence based runtime process 500 receives the game rules and AI model(s) retrieval request from the client device and returns the current AI models and game rules (at 510) to the client device and in the data transmission format.

Turning back to the client device side, the client-side artificial intelligence based runtime process 400 initiates the local artificial intelligence engine ("AI engine") with the current (and local) AI model(s) received from the server-side artificial intelligence based runtime process 500 running on the cloud services side. Game state detection is possible in realtime by initiating the AI engine with the local AI model on the game (client) device 110 in connection with the running client application 120. Next, the client-side artificial intelligence based runtime process 400 collects video feed(s) from the client device (at 440) and then identifies the game (at 450) via the local AI engine and output from the AI model.

After the game is identified, by analysis of the video feed(s) and by way of the local AI engine running on the client (game) device, the client-side artificial intelligence based runtime process 400 loads the game rules (at 460) with a list of game states as provided for the game in the game rules. Then the client-side artificial intelligence based runtime process 400 monitors the game for state changes (at 470). Specifically, a second local (client application installed) AI model/AI engine monitors the video for a game state change. For example, the game state can be monitored by analyzing the video feed(s) for a change in state, such as a "kill" or "death" of player in the game, or otherwise as outlined by the artificial intelligence based process for detecting video game state 200 described above, by reference to FIG. 2. Next, the client-side artificial intelligence based runtime process 400 determines (at 480) whether the game state changed or not. When the game state stays the same (no change in game state), then the client-side artificial intelligence based runtime process 400 returns back to the step for collecting the video feed from the client device (at 440), and proceeds in sequence through the steps noted above. On the other hand, when the game state is determined (at 480) to have changed, then the client-side artificial intelligence based runtime process 400 packages the game data for transmission to the cloud services-side for processing based on the game rules (at 490). In some embodiments, a game state change is detected when and if it was listed in the game state list (and is therefore considered "important" as a game state for the game), then the game data is packaged, based on recent video (e.g., the prior five-six second of video up to the game state change, with packaging of the five-six second video clip data being compressed).

On the cloud services side, the server-side artificial intelligence based runtime process 500 receives the game data (at 520) that was packaged and transmitted by the client application running on the client device. Next, the server-side artificial intelligence based runtime process 500 evaluates the game data against the business rules (at 530) and presents to the customer for feedback. In some embodiments, the server-side artificial intelligence based runtime process 500 performs a detection step to detect minor changes to workflows, user interface (UI), and/or customer feedback (at 540), and in some embodiments, presents the results (at 550) to customer to collect the feedback first. This may also include a series of automated reviews being made. Next, the server-side artificial intelligence based runtime process 500 feeds the aggregate information back into the AI model generation to automatically retrain the AI model(s) and relaunch/deploy the new AI model(s) when so retrained/updated (at 560). The deployment or relaunching is performed by the server-side artificial intelligence based runtime process 500 at the step 510, described above for returning the current (retrained/updated) AI model(s) and game rules (and data transmission format) to the client application running on the client device (at 510). The client-side and server-side artificial intelligence based runtime processes for detecting video game state and game behavior continue in this sequential interactive manner until the game play completely ends for the client application running on the client device (or rather, until the client application is re-initiated on the client device the next time).

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", and/or "client application" are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
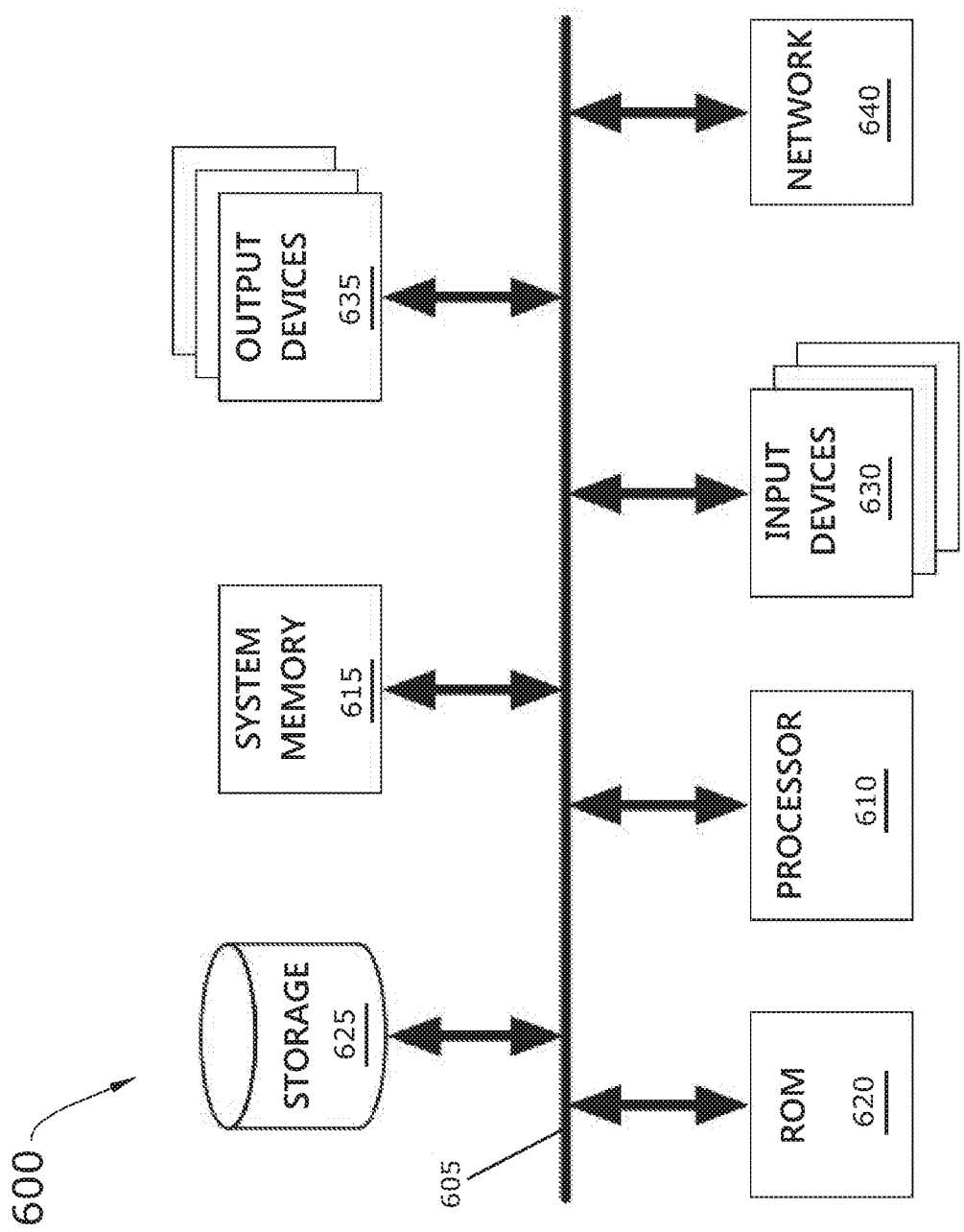
FIG. 5 conceptually illustrates an electronic system with which some embodiments of the invention are implemented.

FIG. 5 conceptually illustrates an electronic system 600 with which some embodiments of the invention are implemented. The electronic system 600 may be a computer, phone, PDA, electronic gaming device, video game platform, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as cathode ray tubes (CRT) or liquid crystal displays (LCD). Some embodiments include a touchscreen that functions as both an input and output device.

Finally, as shown in FIG. 5, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 2 and 4 conceptually illustrate processes. The specific operations of each process may not be performed in the exact order shown and described.

Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. An artificial intelligence based video game state and game behavior detection system comprising:
    a gaming client computing device comprising a processor and a permanent storage device;
    a video game state detection client application that is stored in the permanent storage device and, when executed, runs on the processor of the gaming client computing device;
    an artificial intelligence (AI) model that defines a configuration of the video game state detection client application while running on the processor of the gaming client computing device;
    an AI engine that detects game state changes of a video game running on the gaming client computing device by collecting and processing game data locally on the gaming client computing device while the video game is running and engaged by a user; and
    a cloud service that receives game data packages for business transaction processing and AI model retraining, wherein the game data packages are received from the video game state detection client application running on the gaming client computing device when a game state change is detected by the AI engine.

2. The artificial intelligence based video game state and game behavior detection system of claim 1, wherein the video game state detection client application is configured to retrieve game rules from the video game upon determination of an identity of the video game.

3. The artificial intelligence based video game state and game behavior detection system of claim 2, wherein the game state change is detected by the AI engine when the game state is listed in the game rules for the video game.

4. The artificial intelligence based video game state and game behavior detection system of claim 1, wherein the game data comprises video data obtained locally on the gaming client computing device by the video game state detection client application in connection with the video game running on the processor of the gaming client computing device.

5. The artificial intelligence based video game state and game behavior detection system of claim 1, wherein the video game state detection client application checks the cloud service for any updated AI model upon initiation of the video game, wherein the video game state detection client application downloads an updated AI model that is based on the cloud service retraining a prior AI model.

6. A non-transitory computer readable medium storing an artificial intelligence rules logic program which, when executed by a processor of a gaming client computing device, performs video game state detection, said artificial intelligence rules logic program comprising sets of instructions for:
    starting video collection and an artificial intelligence (AI) engine that is based on an AI model;
    determining a video game to monitor and detect state changes by the AI engine based on video collected of the video game during game play by a user;
    loading game rules for the video game;
    determining a game state of the video game;
    determining a match state of the video game;
    identifying a match identifier (ID);
    determining a gamer match state;
    capturing and packaging game data comprising a short clip of video; and
    transmitting the packaged game data to a cloud service for business transaction processing and AI model retraining.

7. The non-transitory computer readable medium of claim 6, wherein the game rules are loaded based on the determination of the video game to monitor.

8. The non-transitory computer readable medium of claim 6, wherein the video game is finished when the gamer match state is determined to be a gamer exit state.

9. The non-transitory computer readable medium of claim 6, wherein the game state is re-determined when the match state of the video game is determined to be a match end status.

10. The non-transitory computer readable medium of claim 6, wherein the set of instructions for capturing and packaging game data comprising the short clip of video comprises sets of instructions for:
    capturing game data when the gamer match state is determined to be listed in the game rules for the video game; and
    packaging the game data in accordance with game rules for game data format and compressing the package game data for transmission to the cloud service.

* * * * *